United States Patent
Chen et al.

(10) Patent No.: US 10,676,019 B2
(45) Date of Patent: Jun. 9, 2020

(54) VEHICLE DUAL-FUNCTIONAL LIGHTING MODULE AND VEHICLE DUAL-FUNCTIONAL LIGHTING SET

(71) Applicant: EXCELLENCE OPTOELECTRONICS INC., Miaoli (TW)

(72) Inventors: Yu-Chu Chen, Yunlin (TW); Sheng-Hua Yang, Taichung (TW)

(73) Assignee: EXCELLENCE OPTOELECTRONICS INC., Miaoli (TW)

( * ) Notice: Subject to any disclaimer, the term of this patent is extended or adjusted under 35 U.S.C. 154(b) by 44 days.

(21) Appl. No.: 15/962,320

(22) Filed: Apr. 25, 2018

(65) Prior Publication Data

US 2019/0275925 A1     Sep. 12, 2019

(30) Foreign Application Priority Data

Mar. 12, 2018   (TW) .............................. 107108298 A

(51) Int. Cl.
*B60Q 1/44*     (2006.01)
*B60Q 1/20*     (2006.01)
(Continued)

(52) U.S. Cl.
CPC ............. *B60Q 1/20* (2013.01); *B60Q 1/2607* (2013.01); *B60Q 1/2696* (2013.01); *B60Q 1/28* (2013.01);
(Continued)

(58) Field of Classification Search
CPC ... B60Q 1/20; B60Q 1/22; B60Q 1/24; B60Q 1/28; B60Q 1/44; B60Q 1/2607;
(Continued)

(56) References Cited

U.S. PATENT DOCUMENTS 6,065,845 A * 5/2000 Miyazaki ............... G01D 11/28
                                                            362/23.07
7,841,750 B2 * 11/2010 Wilcox .................. F21S 8/081
                                                            362/309
(Continued)

FOREIGN PATENT DOCUMENTS

CN      104903642 A      9/2015
JP      2000251508 A     9/2000
(Continued)

*Primary Examiner* — Evan P Dzierzynski
*Assistant Examiner* — Keith G. Delahoussaye
(74) *Attorney, Agent, or Firm* — AEON Law, PLLC; Adam L. K. Philipp; Jonathan E. Olson

(57) ABSTRACT

A vehicle dual-functional lighting module is provided, including a light guide layer having a top surface, a bottom surface and at least one side surface, one lateral solid-state light source located on the side surface of the light guide layer and emitting a first light in a first direction, and one direct light solid-state light source located below the light guide layer and emitting a second light selectively in a second direction. The first light is guided by the side surface and led out of the top surface to present a surface-illuminated surface light source. The first direction is substantially perpendicular to the second direction. The second light is emitted toward the top surface to present an intensified light source which is located in the surface light source to selectively enhance the illumination intensity locally of the surface light source. A vehicle dual-functional lighting set is also provided.

8 Claims, 7 Drawing Sheets

(51) Int. Cl.
*B60Q 1/26* (2006.01)
*B60Q 1/28* (2006.01)
*F21V 8/00* (2006.01)
*F21S 43/30* (2018.01)
*F21S 43/40* (2018.01)
*F21S 43/245* (2018.01)
*B60Q 1/34* (2006.01)
*F21S 43/14* (2018.01)
*F21S 43/20* (2018.01)
*F21S 43/249* (2018.01)
*B60Q 1/30* (2006.01)
*F21S 43/15* (2018.01)
*F21S 43/239* (2018.01)
*F21W 105/00* (2018.01)
*F21W 103/20* (2018.01)
*F21W 103/10* (2018.01)
*F21W 103/35* (2018.01)

(52) U.S. Cl.
CPC ............... *B60Q 1/30* (2013.01); *B60Q 1/34* (2013.01); *B60Q 1/44* (2013.01); *F21S 43/14* (2018.01); *F21S 43/15* (2018.01); *F21S 43/239* (2018.01); *F21S 43/245* (2018.01); *F21S 43/249* (2018.01); *F21S 43/26* (2018.01); *F21S 43/30* (2018.01); *F21S 43/40* (2018.01); *G02B 6/009* (2013.01); *G02B 6/0036* (2013.01); *G02B 6/0045* (2013.01); *G02B 6/0068* (2013.01); *F21W 2103/10* (2018.01); *F21W 2103/20* (2018.01); *F21W 2103/35* (2018.01); *F21W 2105/00* (2018.01)

(58) Field of Classification Search
CPC .... B60Q 2400/20; F12S 43/19; F12S 43/235; F12S 43/241–249; G02B 6/0018; G02B 6/002
USPC ............................................ 362/541, 543, 544
See application file for complete search history.

(56) References Cited

U.S. PATENT DOCUMENTS

| 9,599,308 | B2* | 3/2017 | Ender | B60Q 1/0058 |
| 2003/0147253 | A1* | 8/2003 | Shy | B60Q 1/2665 362/545 |
| 2003/0214818 | A1* | 11/2003 | Ehara | G02B 6/0016 362/558 |
| 2004/0130912 | A1* | 7/2004 | Miyashita | G02B 6/002 362/561 |
| 2015/0330593 | A1* | 11/2015 | Larsen | B60Q 1/2607 362/511 |
| 2018/0209604 | A1* | 7/2018 | Kim | H01L 33/64 |
| 2018/0229648 | A1* | 8/2018 | Meier | B60Q 1/2665 |

FOREIGN PATENT DOCUMENTS

| JP | 2009230996 A | 10/2009 |
| JP | 2013062074 A | 4/2013 |
| JP | 2014146750 A | 8/2014 |
| JP | 2015103363 A | 6/2015 |
| JP | 2016115559 A | 6/2016 |
| JP | 2016195097 A | 11/2016 |

* cited by examiner

VEHICLE DUAL-FUNCTIONAL LIGHTING MODULE AND VEHICLE DUAL-FUNCTIONAL LIGHTING SET

BACKGROUND

1. Technical Field

The present disclosure relates to a vehicle dual-functional lighting module and a vehicle dual-functional lighting set; in particular, to a vehicle dual-functional lighting module and a vehicle dual-functional lighting set thereof which are capable of providing two illumination effects.

2. Description of Related Art

Despite the fact that light-emitting diodes are applied to the vehicle lighting and illuminating with the rising popularity, the light-emitting diodes are point light sources. Conventionally, multiple light-emitting diodes are gathered to generate a similar surface light source in terms of the application of vehicle lighting and illuminating. However, such a dazzlingly bright would make the human visual perception uncomfortable, thus leaving room for improvement.

In addition, some vehicles are disposed with a light guide bar for producing a strip-shaped illumination effect, which is mostly served as the vehicle tail lamps. However, brake lights typically need stronger illumination intensity. In terms of conventional vehicle lighting modules, the existing brake lighting modules and vehicle LED tail lamps are mostly disposed in a separate arrangement, so that another lighting module is necessary, thus resulting in the increase of the manufacturing cost, as well as the rise of the assembly working hours and the manpower and time cost.

SUMMARY

The primary purpose of the present disclosure is to provide a vehicle dual-functional lighting module capable of producing at least two kinds of illumination effects in one illuminating module, which not only can be used as a tail lamp presenting a surface-illuminated surface light source, but also provide the brake light in the same lighting module.

For the sake of resolving the aforementioned drawbacks, the present disclosure provides a vehicle dual-functional lighting module which includes a light guide layer, at least one lateral solid-state light source, and at least one direct light solid-state light source. The light guide layer has a top surface, a bottom surface and at least one side surface. The lateral solid-state light source is located on the side surface of the light guide layer and emits a first light in a first direction. The first light is guided by the side surface of the light guide layer and is led out of the top surface to present a surface-illuminated surface light source. The direct light solid-state light source is located below the light guide layer and emits a second light selectively in a second direction. The first direction is substantially perpendicular to the second direction. The second light is emitted toward the top surface so as to present an intensified light source for enhancing illumination. The position of the intensified light source is located in the surface light source, so as to selectively enhance the illumination intensity locally of the surface light source.

In addition, there is a need to provide a dual-functional vehicle lighting set which is capable of producing at least two kinds of illumination effects in one illuminating module, which not only can be used as a tail lamp presenting a surface-illuminated surface light source, but also provide the brake light in the same lighting module; in addition, the lateral solid-state light source can cooperate with the direct light solid-state light source to provide the blinking effect, which can be served as the direction light.

For the sake of resolving the aforementioned drawbacks, the present disclosure further provides a dual-functional vehicle lighting set which includes a bearing member; a printed circuit board disposed on the bearing member; a reflection layer disposed on an upper surface of the printed circuit board; a light guide layer disposed on the printed circuit board and having a top surface, a bottom surface and at least one side surface; a diffuser plate located on the light guide layer; a plurality of lateral solid-state light sources disposed on the printed circuit board, in which each lateral solid-state light source is located on the side surface of the light guide layer and emits a first light in a first direction, and the first light is guided by the side surface of the light guide layer and is led out of the top surface to present a surface-illuminated surface light source; and a plurality of direct light solid-state light sources disposed on the printed circuit board, in which each direct light solid-state light source is located on the reflection layer and below the light guide layer and emits a second light selectively in a second direction and the second light is emitted toward the top surface of the light guide layer; in which the first direction is substantially perpendicular to the second direction, the second light is emitted toward the top surface and located in the surface-illuminated surface light source so as to enhance the illumination intensity locally of the surface light source.

To sum up, the present disclosure not only can present a surface-illuminated surface light source, but also provide an intensified light source located in the surface-illuminated surface light source to selectively enhance the illumination intensity locally of the surface light source. The vehicle dual-functional lighting set provided by the present disclosure not only can present a surface-illuminated surface light source as a tail lamp, but also provide brake light in the same lighting set. In addition, the lateral solid-state light source can cooperate with the direct light solid-state light source to provide the blinking effect which can be served as the direction light. Compared with conventional vehicle lighting sets, LED tail lamps present mostly a strip-shaped illumination effect instead of a surface-illuminated surface light source, and conventional brake lighting sets and vehicle LED tail lamps are mostly disposed in a separate arrangement, so that another lighting module is necessary, thus resulting in the increase of the manufacturing cost, as well as the rise of the assembly working hours and the manpower and time cost.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
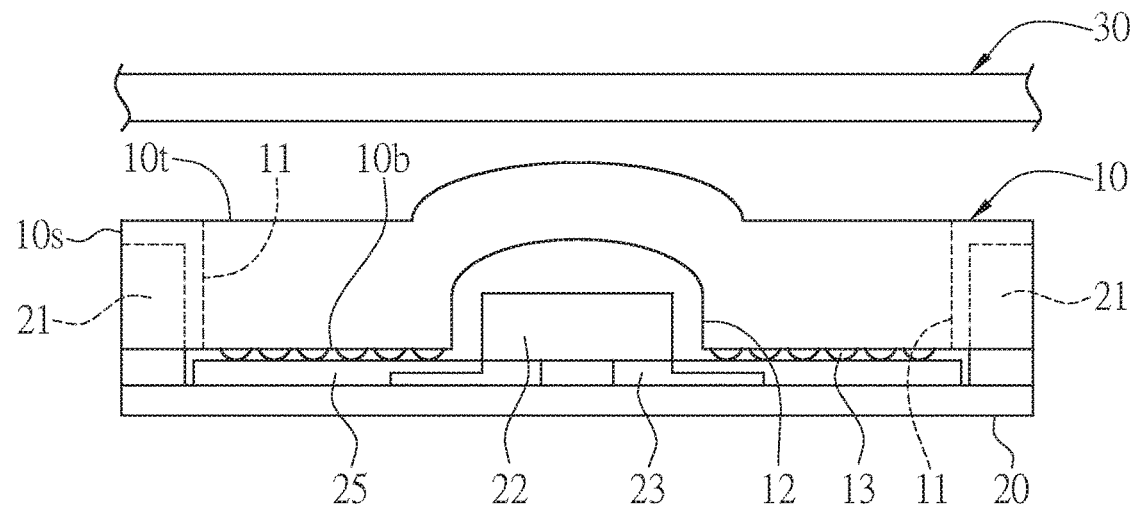
FIG. 1 is a schematic diagram illustrating a side surface of the vehicle dual-functional lighting module of the present disclosure.
Figure 2:
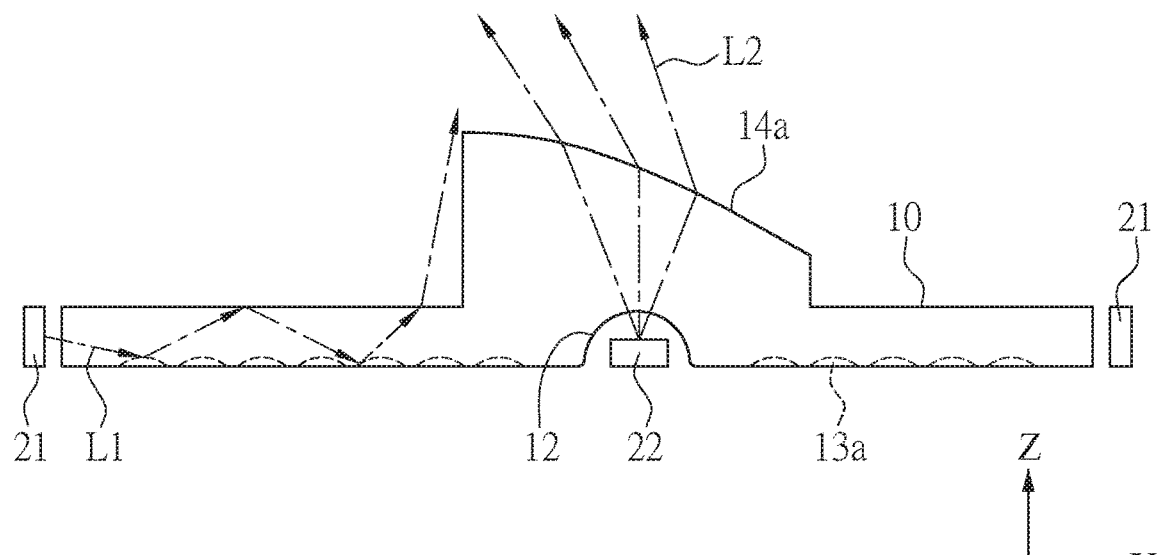
FIG. 2 is a schematic diagram illustrating the illumination of the first light and the second light of the vehicle dual-functional lighting module of the present disclosure.
Figure 3A:
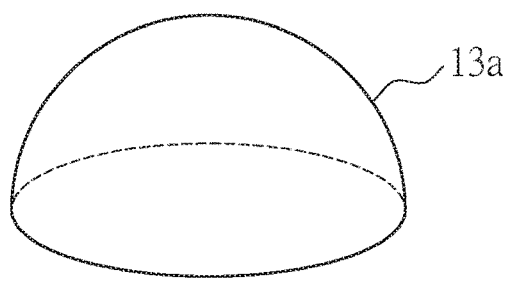
FIG. 3A to FIG. 3F are the schematic diagrams illustrating various lower microstructures of the vehicle dual-functional lighting module of the present disclosure.
Figure 3B:
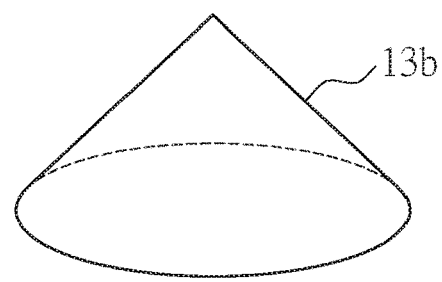
Figure 3C:
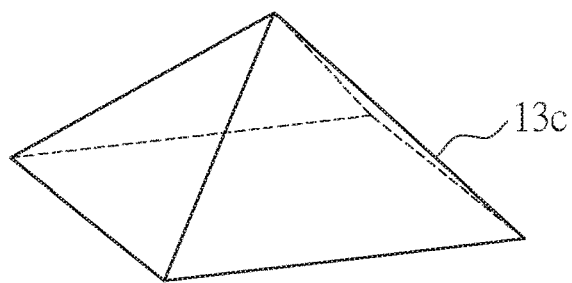
Figure 3D:
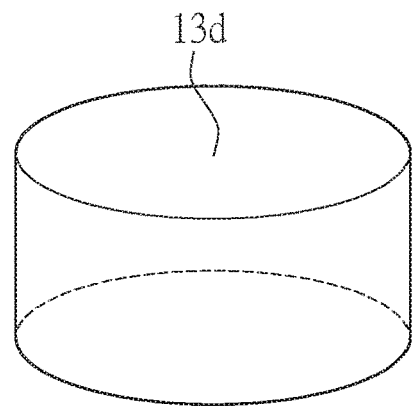
Figure 3E:
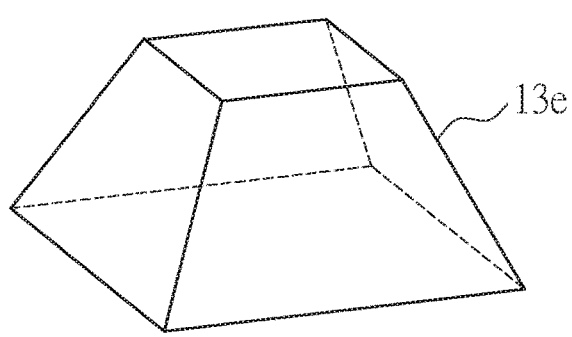
Figure 3F:
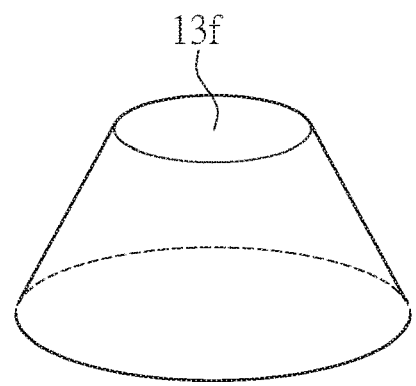

Referring FIG. 1 and FIG. 2, a schematic diagram illustrating a side surface of the vehicle dual-functional lighting module of the present disclosure and a schematic diagram illustrating the illumination of the first light and the second light of the vehicle dual-functional lighting module of the present disclosure are provided. A vehicle dual-functional lighting module 100 of the present disclosure includes a light guide layer 10, at least one lateral solid-state light source 21 and at least one direct light solid-state light source 22. The light guide layer 10 includes a top surface 10$t$, a bottom surface 10$b$ and at least one side surface 10$s$. The lateral solid-state light source 21 is located on the side surface 10$s$ of the light guide layer 10 and emits a first light L1 in a first direction. In the present embodiment, the first direction is parallel to the direction of the light guide layer 10 as can be referred to the X-axis direction shown in FIG. 2. The first light L1 is guided by the side surface 10$s$ of the light guide layer 10 and is led out of the top surface 10$t$ to present a surface-illuminated surface light source. The aforementioned solid-state light source employs a solid-state device, i.e. a semiconductor element light such as a light-emitting diode, an organic light-emitting diode, or a high polymer light-emitting diode as the light source, in which light-emitting diode is abbreviated as LED.

The direct light solid-state light source 22 is located below the light guide layer 10 and emits a second light L2 selectively in a second direction, and the first direction is substantially perpendicular to the second direction. In the present embodiment, the second direction is perpendicular to the direction of the light guide layer 10 as can be referred to the Z-axis direction shown in FIG. 2. The second light L2 is emitted toward the top surface 10$t$ of the light guide layer 10 so as to present an intensified light source for enhancing illumination, and the position of the intensified light source is located in the surface light source, so as to selectively enhance the illumination intensity locally of the surface light source. Here, the sentence of "emits a second light L2 "selectively"" means that in the present embodiment the direct light solid-state light source 22 is turned on if necessary. For example, the first light L1 is used as a vehicle tail lamp and the second light L2 generates the direct light source, which is applicable to vehicle brake lights, reversing lights, and so on to enhance the illumination intensity.

Figure 9:
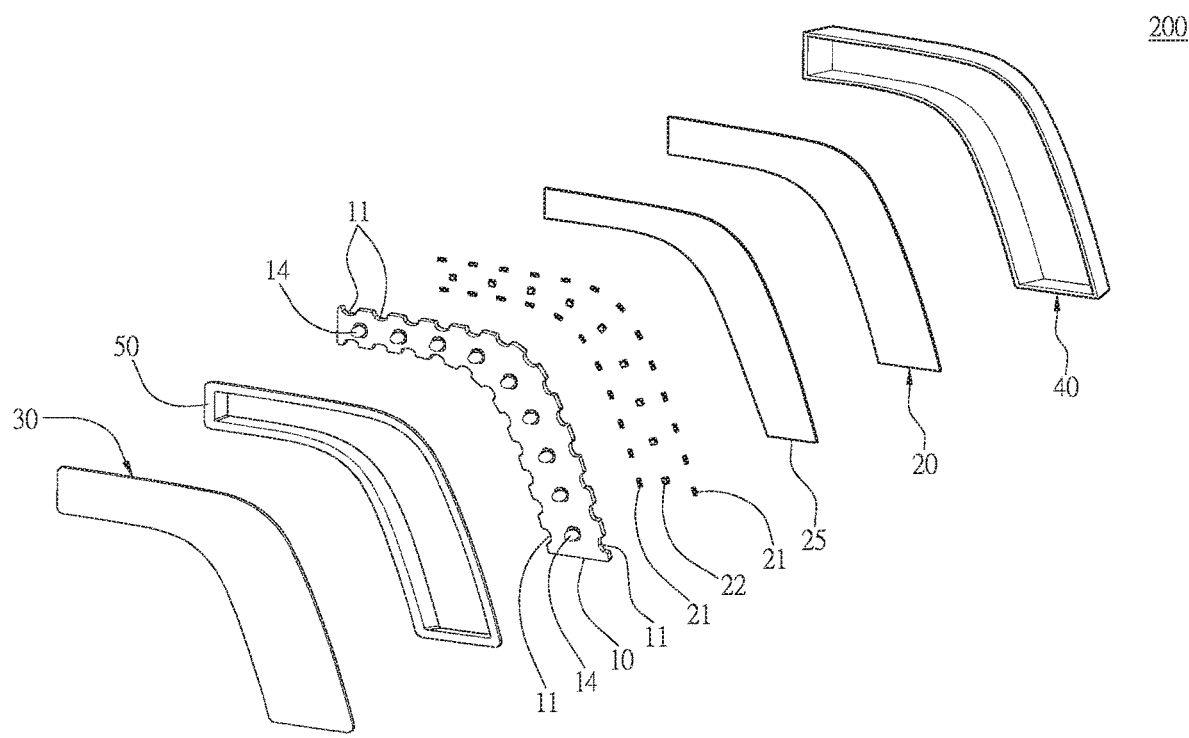
FIG. 9 is a three-dimensional exploded view illustrating the vehicle dual-functional lighting set of the present disclosure.

As shown in FIG. 1, in the present embodiment, the bottom surface 10$b$ of the light guide layer 10 is disposed with a plurality of direct light solid-state light sources 22, and the plurality of direct light solid-state light sources 22 can be arranged in a line shape, an arc shape, a face shape, and so on. The light guide layer 10 has two opposite side surfaces 10$s$, each side surface 1O$s$ can be disposed with a plurality of lateral solid-state light sources 21, and the first lights L1 emitted by the plurality of lateral solid-state light sources 21 face the plurality of direct light solid-state light sources 22. As shown in FIG. 9, each two lateral solid-state light sources 21 on the two opposite side surfaces 1O$s$ are formed as one pair of the plurality of lateral solid-state light sources 21. So that there are a lot of pairs of the plurality of lateral solid-state light sources 21 shown in FIG. 9. Wherein the plurality of direct light solid-state light sources 22 are between the plurality of lateral solid-state light sources 21. Furthermore each one of the plurality of direct light solid-state light sources 22 corresponded with one pair of the plurality of lateral solid-state light sources 21.

In the present embodiment, the vehicle dual-functional lighting module 100 further includes a printed circuit board 20, and the plurality of lateral solid-state light sources 21 and the plurality of direct light solid-state light sources 22 are disposed on the printed circuit board 20. The plurality of lateral solid-state light sources 21 are disposed at a side of the printed circuit board 20, and the plurality of direct light solid-state light sources 22 are disposed amidst the plurality of lateral solid-state light sources 21.

Reference is made to FIG. 2. By virtue of the aforementioned structural configuration, the first light L1 of the vehicle dual-functional lighting module 100 of the present disclosure can present a surface-illuminated surface light source, and the second L2 of the vehicle dual-functional lighting module 100 of the present disclosure can present an intensified light source and the position of the intensified light source is located in the surface light source, so as to selectively enhance the illumination intensity locally of the surface light source. Thus, the present disclosure not only can be used as the tail lamp presenting a surface-illuminated surface light source, but also can provide a brake light source in the same lighting module. In terms of conventional vehicle lighting modules, most LED tail lamps present a strip-shaped illumination effect instead of a surface-illuminated surface light source, and conventional brake lighting modules and vehicle LED tail lamps are mostly disposed in a separate arrangement, so that another lighting module is necessary, thus resulting in the increase of the manufacturing cost, as well as the rise of the assembly working hours and the manpower and time cost.

The vehicle dual-functional lighting module 100 of the present disclosure further includes a diffuser plate 30 disposed on the light guide layer 10. The light emitted from the light guide layer 10 can be diffused by the diffuser plate 30 to become softer. The diffuser plate 30 is made of the material which has the characteristic of light diffusion such as a plastic plate having the optical features of a predetermined fog grade, light transmittance and refraction index, and can transform the point or line light source into a softer and more uniform surface light source.

In the present embodiment, the light guide layer 10 propagates and distributes light to the distal end thereof by means of the total internal reflection principle, then the diffusion dot at the bottom surface 10$b$ of the light guide layer 10 diffuses the reflected light to various angles, and the dot diffusion patterns having different intensities and sizes are used to break the total internal reflection and guide the light to the top surface 10t of the light guide layer 10.

Figure 4:
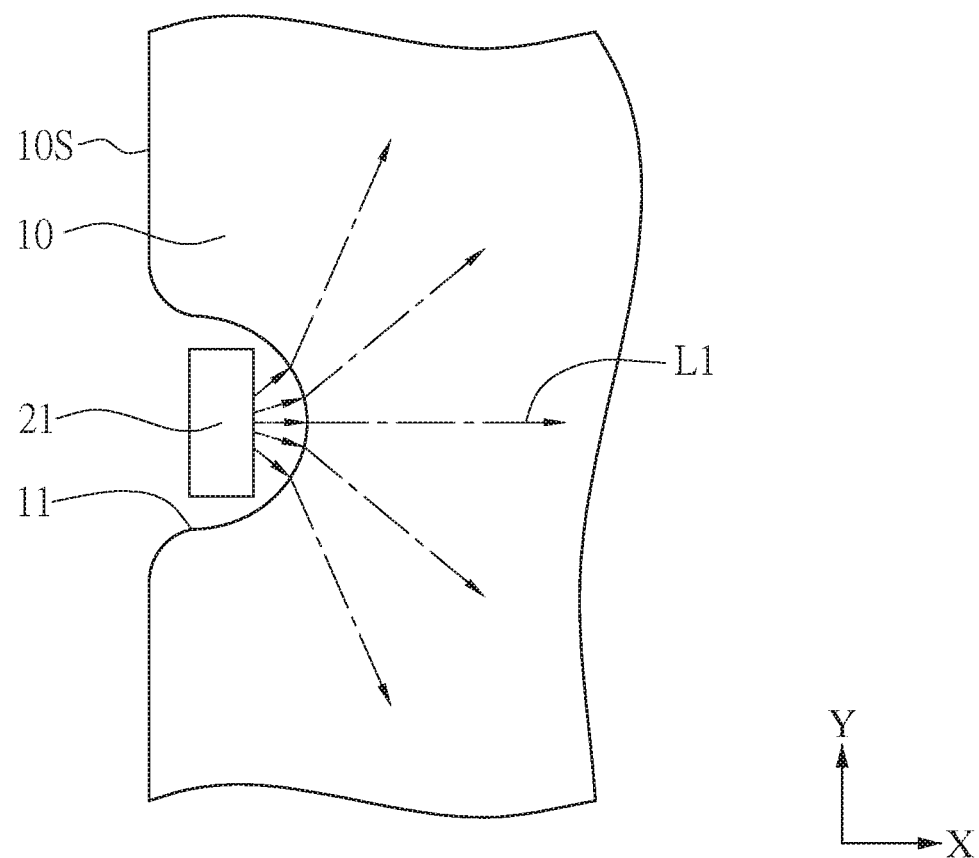
FIG. 4 is a top view of a part of the lateral solid-state light source and the light guide layer of the present disclosure.

More specifically, as shown in FIG. 4, the side surface 10s of the light guide layer 10 is disposed with a concave part 11 for receiving the lateral solid-state light source 21. The number of the concave parts 11 corresponds to the number of the lateral solid-state light sources 21. Here, the concave part 11 is used to reduce the total internal reflection and increase the scattering angle of light so as to decrease the dark field between light sources.

Figure 5:
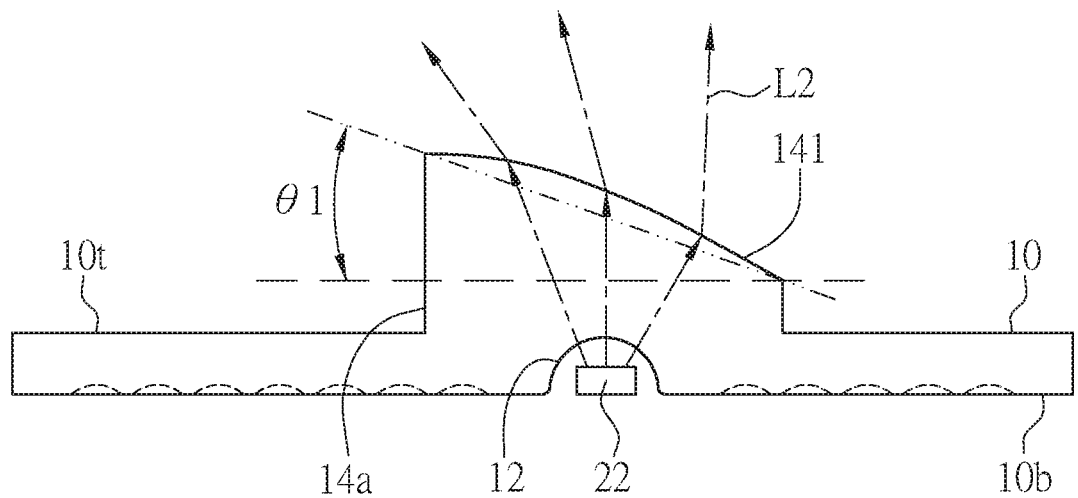
FIG. 5 is a side view of the direct light solid-state light source and the light guide layer of one embodiment of the present disclosure.
Figure 6:
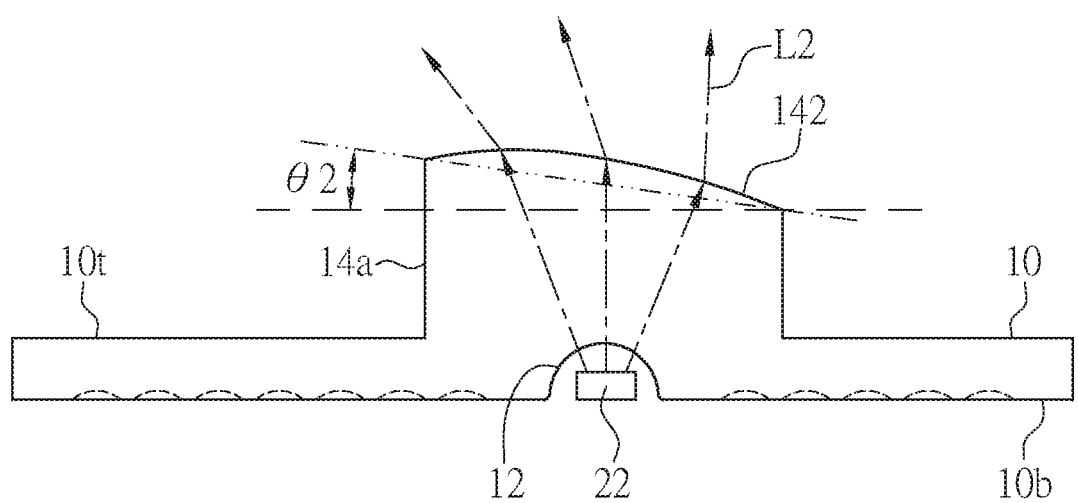
FIG. 6 is a side view of the direct light solid-state light source and the light guide layer of another embodiment of the present disclosure.
Figure 7A:
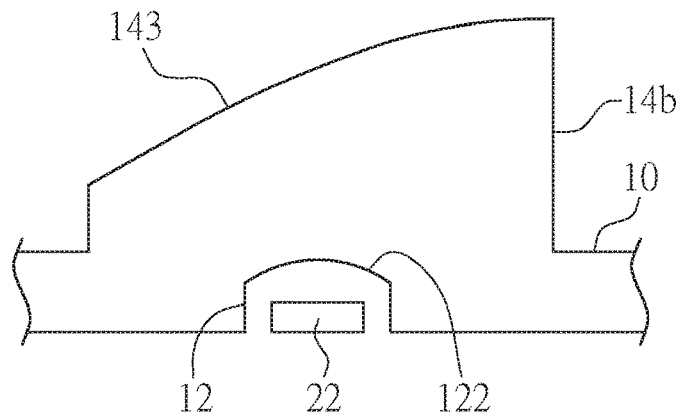
FIG. 7A to FIG. 7C are the schematic diagrams illustrating various light entering sections at the bottom surface of the light guide layer of the present disclosure.
Figure 7B:
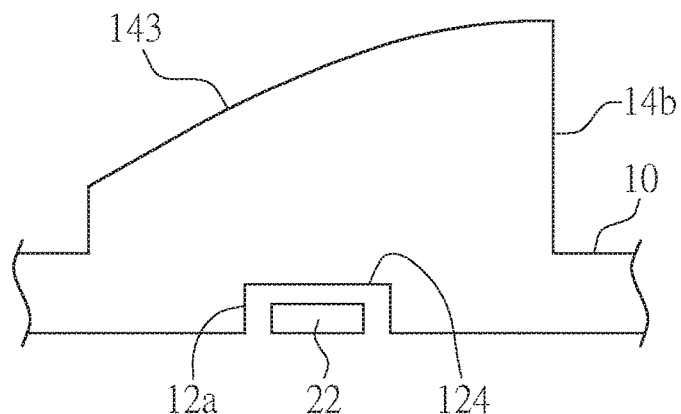
Figure 7C:
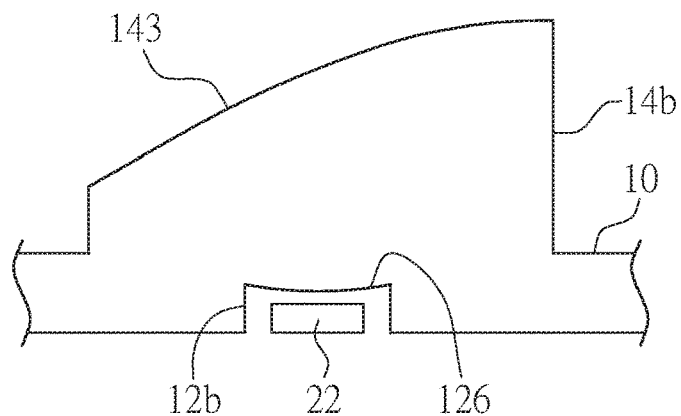

Reference is made to FIG. 5 and FIG. 6. The top surface 10t of the light guide layer 10 has an upper microstructure 14, and the position of the upper microstructure 14 corresponds to the direct light solid-state light source 22. The upper microstructure 14 forms an illuminating surface 141, 142, and deflects and concentrates the second light L2 to change the light distribution. The illuminating surface 141, 142 has an illuminating surface angle relative to the top surface 10t of the light guide layer 10. By means of changing illuminating surface angle, for example, the illuminating surface angle θ1 shown in FIG. 5 that is greater than the illuminating surface angle θ2 shown in FIG. 6, the second light L2 in the present embodiment can be deflected and concentrated to change the light distribution. Here, the illuminating surface 141, 142 presents a curved surface with difference of height. In practice, the curved surface can be a spherical surface, an aspheric surface or a free-form surface, and the present disclosure is not limited thereto. When being applied to vehicle tail lamps, the vehicle dual-functional lighting module 100 of the present embodiment can be arranged at a corner of the vehicle body, and can make the light pattern to project toward a direction in line with the regulatory compliance and generate illumination intensity as appropriate. The illuminating surface shown in the aforementioned figures is used as exemplary examples, and the illuminating surface can be adjusted toward the left side as shown in FIG. 5, or toward the right side as shown in FIG. 7A to FIG. 7C. That is, the direction of a curved surface with difference of height shown in FIG. 7A to FIG. 7C is opposite to that shown in FIG. 5 and FIG. 6, so that the original light-emitting direction of the direct light solid-state light source 22 is deflected toward the left side or the right side.

Another embodiment of the present embodiment is provided by virtue of a computerized simulation, setting the luminous flux of a LED to be 30 lm and the central light intensity to be 9.8 cd. The illuminating surface angle of the illuminating surface and the level surface of the upper microstructure 14 of the top surface 10t of the light guide layer 10 are set under the given conditions, and the parameters are as below.

| Illuminating surface angle | Light deflection angle | Light intensity |
|---|---|---|
| 20 | 10.7 | 18.2 |
| 30 | 28.6 | 18.4 |
| 40 | 40.5 | 18 |
| 45 | 55 | 21.3 |

The bottom surface 10b of the light guide layer 10 is disposed with a plurality of lower microstructures 13 for reflecting the first light L1 to the top surface 10t of the light guide layer 10. The lower microstructures 13 can be, for example, formed as a plurality of diffusion dots by means of manners of printed pattern, mold injection molding, or laser machining; or the lower microstructures 13 can be formed as multiple recessed structures at the bottom surface 10b of the light guide layer 10 through the stamping manner. The lower microstructures 13 can be in different shapes. As shown in FIG. 3A to FIG. 3F, the lower microstructure 13a can be a hemispherical lower microstructure 13a, a conical lower microstructure 13b, a pyramidal lower microstructure 13c, a cylindrical lower microstructure 13d, a trapezoidal lower microstructure 13e, and a semi-conical lower microstructure 13f, and the present disclosure is not limited thereto.

In the present embodiment, for enhancing the utilization rate of light, an upper surface of the printed circuit board 20 is disposed with a reflection layer 25 and the reflection layer 25 faces the bottom surface 10b of the light guide layer 10. The light which leaks from the light guide layer 10 can be reflected into the light guide layer 10 again through the reflection layer 25. The reflection layer 25 can be a leucocratic insulating paint covering a circuit layer 23, and the circuit layer 23 is electrically connected to the lateral solid-state light source 21 and the direct light solid-state light source 22.

Reference is made to FIG. 7A to FIG. 7C. The bottom surface 10b of the light guide layer 10 is disposed with a light entering section 12, 12a, 12b for receiving the direct light solid-state light source 22, the light entering section 12, 12a, 12b as a light entering surface, and the light entering surface can be a concave light entering surface 122, a flat light entering surface 124, or a convex light entering surface 126.

Figure 8:
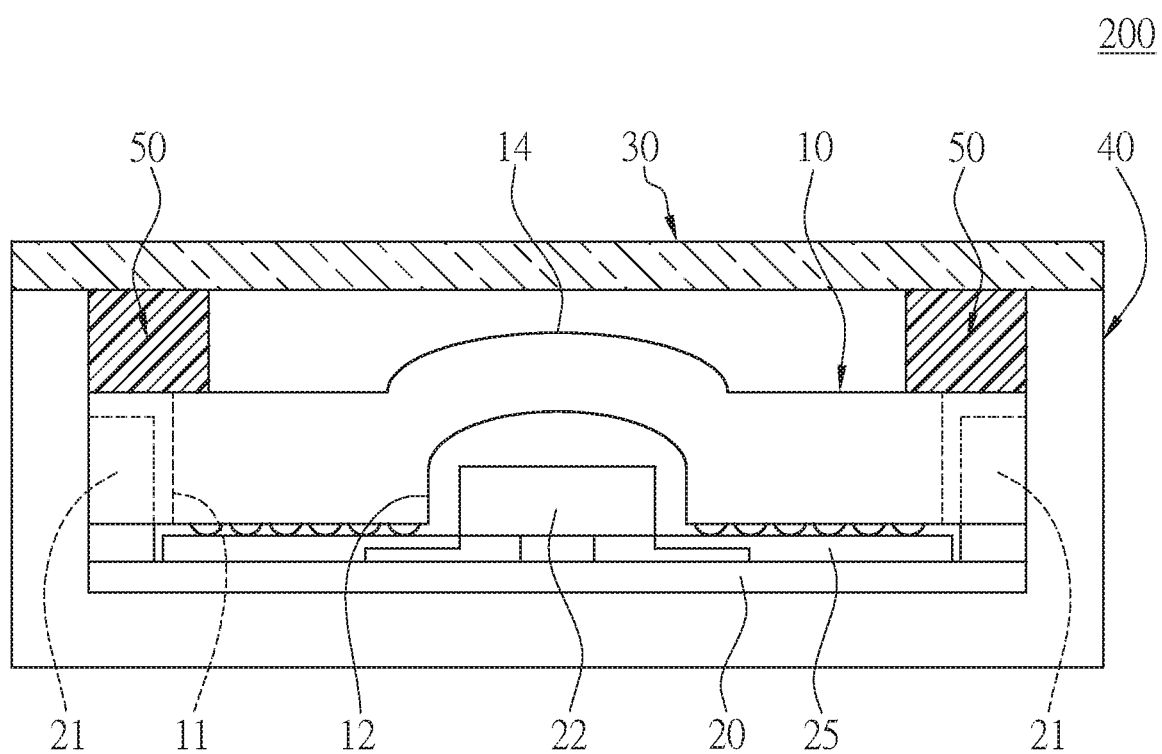
FIG. 8 is a cross-sectional diagram of the vehicle dual-functional lighting set of the present disclosure.

Reference is made to FIG. 8 and FIG. 9. A vehicle dual-functional lighting set 200 is provided, including a bearing member 40, a printed circuit board 20 disposed on the bearing member 40, a light guide layer 10, a diffuser plate 30, a plurality of lateral solid-state light sources 21, and a plurality of direct light solid-state light sources 22. In the present embodiment, the light guide layer 10 is preferably having the flexible characteristic. That is, the light guide layer 10 can be made of a flexible material such as silicone gel, and can work in accord with various illumination patterns of vehicle lamps by collaborating with a flexible printed circuit board (FPCB).

The printed circuit board 20 is disposed on the bearing member 40, and a top surface of the printed circuit board 20 is disposed with the reflection layer 25. The light guide layer 10 is disposed on the printed circuit board 20, and has the top surface 10t, the bottom surface 10b and at least one side surface 10s. The diffuser plate 30 is located on the light guide layer 10. The plurality of lateral solid-state light sources 21 are disposed on the top surface of the printed circuit board 20. Each of the lateral solid-state light sources 21 is located on the side surface 10s of the light guide layer 10 and emits a first light L1 in a first direction, and the first light L1 is guided by the side surface 10s of the light guide layer 10 and is led out of the top surface 10t to present a surface-illuminated surface light source (referring to FIG. 2). The plurality of direct light solid-state light sources 22 are disposed on the top surface of the printed circuit board 20. Each of the direct light solid-state light sources 22 is below the light guide layer 10 and emits a second light L2 selectively in a second direction and the second light L2 is emitted toward the top surface 10t of the light guide layer 10, in which the first direction is substantially perpendicular to the second direction. The second light L2 is emitted toward the top surface 10t of the light guide layer 10 and located in the surface-illuminated surface light source (referring to FIG. 2) so as to enhance the illumination intensity locally of the surface light source.

In a preferred embodiment, the vehicle dual-functional lighting set 200 further includes a light shield member 50, and the light shield member 50 is disposed on the plurality of lateral solid-state light sources 21 to shield the lights of the plurality of lateral solid-state light sources 21. In addition, the plurality of direct light solid-state light sources 22 are between the plurality of lateral solid-state light sources 21.

In summary, the vehicle dual-functional lighting set provided by the present disclosure not only can present a surface-illuminated surface light source, but also present an intensified light source in the surface-illuminated surface light source so as to selectively enhance the illumination intensity locally of the surface light source in the surface-illuminated surface light source, thereby providing at least two kinds of illuminating effects in one illuminating module. That is to say, the vehicle dual-functional lighting set can present three, four or five illuminating effects, but the present disclosure is not limited thereto in practice. The vehicle dual-functional lighting set provided by the present disclosure not only can be applicable to a tail lamp, but also provide brake light in the same lighting set. In addition, the lateral solid-state light source cooperates with the direct light solid-state light source to provide the blinking effect which can be served as the direction light. In terms of conventional vehicle lighting modules, most LED tail lamps present a strip-shaped illumination effect instead of a surface-illuminated surface light source, and the existing conventional brake lighting modules and vehicle LED tail lamps are mostly disposed in a separate arrangement, so that another lighting module is necessary, thus resulting in the increase of the manufacturing cost, as well as the rise of the assembly working hours and the manpower and time cost.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A vehicle dual-functional lighting module, comprising:
    a light guide layer having a top surface, a bottom surface and two opposite side surfaces;
    a plurality of lateral solid-state light sources, wherein the lateral solid-state light sources are located on the two opposite side surfaces of the light guide layer and emits a first light in a first direction, and the first light is guided by the two opposite side surfaces of the light guide layer and is led out of the top surface to present a surface-illuminated surface light source, each two lateral solide-state light sources on the two opposite side surfaces of the light guide layer are formed as one pair of the plurality of lateral solid-state light sources, and
    a plurality of direct light solid-state light sources, wherein the direct light solid-state light sources are located below the light guide layer and emits a second light selectively in a second direction; the first direction is substantially perpendicular to the second direction, the second light is emitted toward the top surface so as to present an intensified light source for enhancing illumination, and the position of the intensified light source is located in the surface light source, so as to selectively enhance the illumination intensity locally of the surface light source; wherein the plurality of direct light solid-state light sources are between the plurality of lateral solid-state light sources, and each one of the plurality of direct light solid-state light sources corresponded with one pair of the plurality of lateral solid-state light sources;
    wherein the two opposite side surfaces of the light guide layer is disposed with a plurality of concave parts for receiving the plurality of lateral solid-state light sources;
    wherein the top surface of the light guide layer has a plurality of upper microstructures, the position of each one of the plurality of upper microstructures corresponds to each one of the plurality of direct light solid-state light sources; each one of the plurality of upper microstructures forms an illuminating surface, and the illuminating surface presents a curved surface with difference of height;
    wherein, each one of the plurality of upper microstructures is corresponded with each one of the plurality of direct light solid-state light sources;
    wherein the bottom surface of the light guide layer is disposed with a light entering section for receiving the plurality of direct light solid-state light sources, the light entering section has a light entering surface, and the light entering surface is a concave surface or a convex surface;
    wherein the bottom surface of the light guide layer is disposed with a plurality of lower microstructures for reflecting the first light toward the top surface of the light guide layer;
    wherein, the plurality of lower microstructures are disposed between each one of the plurality of direct light solid-state light sources and each one pair of the plurality of lateral solid-state light sources;
    wherein the plurality of lower microstructures are formed as multiple recessed structures.

2. The vehicle dual-functional lighting module according to claim 1, further comprising a diffuser plate, wherein the diffuser plate is located on the light guide layer.

3. The vehicle dual-functional lighting module according to claim 1, wherein the first lights emitted by the plurality of lateral solid-state light sources face the plurality of direct light solid-state light sources.

4. The vehicle dual-functional lighting module according to claim 3, further comprising a printed circuit board, wherein the plurality of lateral solid-state light sources and the plurality of direct light solid-state light sources are disposed on the printed circuit board, the plurality of lateral solid-state light sources are distributed at a side of the printed circuit board, and the plurality of direct light solid-state light sources are disposed amidst the plurality of lateral solid-state light sources.

5. The vehicle dual-functional lighting module according to claim 4, wherein an upper surface of the printed circuit board is disposed with a reflection layer and the reflection layer faces the bottom surface of the light guide layer.

6. A vehicle dual-functional lighting set, comprising:
    a bearing member;
    a printed circuit board disposed on the bearing member, and a top surface of the printed circuit board disposed with a reflection layer;
    a light guide layer disposed on the printed circuit board and having a top surface, a bottom surface and two opposite side surfaces;
    a diffuser plate located on the light guide layer;
    a plurality of lateral solid-state light sources disposed on the printed circuit board, wherein each lateral solid-state light source is located on the two opposite side surfaces of the light guide layer and emits a first light in a first direction, and the first light is guided by the two opposite side surfaces of the light guide layer and is led out of the top surface to present a surface-illuminated surface light source, each two lateral solide-state light sources on the two opposite side surfaces of the light guide layer are formed as one pair of the plurality of lateral solid-state light sources, and a plurality of direct light solid-state light sources disposed on the printed circuit board, wherein each direct light solid-state light source is located on the reflection layer and below the light guide layer and emits a second light selectively in a second direction, and the second light is emitted toward the top surface of the light guide layer; wherein the plurality of direct light solid-state light sources are between the plurality of lateral solid-state light sources, and each one of the plurality of direct light solid-state light sources corresponded with one pair of the plurality of lateral solid-state light sources;

wherein the first direction is substantially perpendicular to the second direction, the second light is emitted toward the top surface and located in the surface-illuminated surface light source so as to enhance the illumination intensity locally of the surface light source;

wherein the two opposite side surfaces of the light guide layer is disposed with a plurality of concave parts for receiving the plurality of lateral solid-state light sources;

wherein the top surface of the light guide layer has a plurality of upper microstructures, the position of each one of the plurality of upper microstructures corresponds to each one of the plurality of direct light solid-state light sources; each one of the plurality of upper microstructure forms an illuminating surface, and the illuminating surface presents a curved surface with difference of height;

wherein, each one of the plurality of upper microstructures is corresponded with each one of the plurality of direct light solid-state light sources;

wherein the bottom surface of the light guide layer is disposed with a light entering section for receiving the direct light solid-state light source, the light entering section has a light entering surface, and the light entering surface is a concave surface or a convex surface;

wherein the bottom surface of the light guide layer is disposed with a plurality of lower microstructures for reflecting the first light toward the top surface of the light guide layer, the plurality of lower microstructures are disposed between each one of the plurality of direct light solid-state light sources and each one pair of the plurality of lateral solid-state light sources;

wherein the plurality of lower microstructures are formed as multiple recessed structures.

7. The dual-functional vehicle lighting set according to claim 6, further comprising a light shield member, wherein the light shield member is disposed on the plurality of lateral solid-state light sources to shield the lights of the plurality of lateral solid-state light sources.

8. The vehicle dual-functional lighting set according to claim 6, wherein the light guide layer is made of a flexible material and the printed circuit board is a flexible printed circuit board.

* * * * *